(12) United States Patent
Thoms

(10) Patent No.: US 7,201,183 B2
(45) Date of Patent: Apr. 10, 2007

(54) VALVE ARRANGEMENT IN A HYDRAULIC CIRCUIT, USE OF THE SAME AND ARRANGEMENT FOR CONTROLLING A HYDRAULIC VEHICLE DRIVE

(75) Inventor: Reinhardt Thoms, Neumunster (DE)

(73) Assignee: Sauer-Danfoss, Inc., Ames, IA (US)

( * ) Notice: Subject to any disclaimer, the term of this patent is extended or adjusted under 35 U.S.C. 154(b) by 255 days.

(21) Appl. No.: 11/060,836

(22) Filed: Feb. 18, 2005

(65) Prior Publication Data
US 2005/0279409 A1  Dec. 22, 2005

(30) Foreign Application Priority Data
Jun. 22, 2004  (DE) ...................... 10 2004 030 045

(51) Int. Cl.
*F16K 17/18* (2006.01)
(52) U.S. Cl. ................ 137/491; 137/493.3; 137/493.6; 137/493.9; 137/508
(58) Field of Classification Search ................ 137/491, 137/492.5, 493.3, 493.6, 493.9, 508
See application file for complete search history.

(56) References Cited

U.S. PATENT DOCUMENTS

| 3,432,008 | A | * | 3/1969 | Henry-Biabaud | ........ 137/493.8 |
| 4,016,903 | A | * | 4/1977 | Akashi et al. | ........... 137/493.5 |
| 4,217,927 | A | * | 8/1980 | Morita | .................... 137/493.3 |
| 4,476,890 | A | * | 10/1984 | Kawasaki et al. | .......... 137/491 |
| 6,105,608 | A | * | 8/2000 | Katzman | .................... 137/491 |

* cited by examiner

*Primary Examiner*—Stephen M. Hepperle

(57) ABSTRACT

A valve arrangement in a hydraulic circuit comprises a longitudinal duct 3 and a transverse duct 2. A throttle slide 10 can be displaced in the direction of the longitudinal duct 3. Arranged in the throttle slide 10 is a valve piston 25, by means of which the flow through the hollow throttle slide 10 can be enabled or blocked. The flow of hydraulic fluid takes place through two groups of passage holes 33a, 35a, which are arranged in the throttle slide 10. The interaction of pressure and flow direction of the hydraulic fluid, and also the restoring force of a slide spring 20 and a piston spring 30, achieves a situation where hydraulic fluid can flow through the valve arrangement in both directions but that a throttling action occurs only when the hydraulic fluid flows from the transfer duct 2 to the longitudinal duct 3 under increased pressure.

18 Claims, 6 Drawing Sheets

VALVE ARRANGEMENT IN A HYDRAULIC CIRCUIT, USE OF THE SAME AND ARRANGEMENT FOR CONTROLLING A HYDRAULIC VEHICLE DRIVE

BACKGROUND AND SUMMARY OF THE INVENTION

The invention relates to a valve arrangement in a hydraulic circuit, its use and an arrangement for controlling a hydraulic vehicle drive. In hydraulic control systems there is a need for a valve arrangement which acts as a throttling valve when the pressure of the hydraulic fluid flowing through exceeds a specific threshold value. One important application of this is arrangements for controlling hydraulic vehicle drives. The latter generally have a closed hydraulic circuit which has an variable displacement pump driven by a diesel engine, a hydraulic motor driving the drive wheels of the vehicle and two lines connecting the variable displacement pump and the hydraulic motor for the hydraulic fluid, it being possible for each of the lines, depending on the direction of travel of the vehicle to be the flow or the return line for the hydraulic motor (DE 199 30 997 A1). In hydraulic circuits of this type, the hydraulic motor can act as a pump when the vehicle changes from the normal driven state to trailing or overrun operation. The vehicle then attempts to accelerate the variable displacement pump and therefore also the diesel engine, which can lead to damage to the diesel engine.

For this reason, it has already been proposed, according to DE 199 30 997 A1, to insert into the return line of the hydraulic circuit a pressure regulating valve which acts as a throttle and which acts in the event of increased pressure of the hydraulic fluid flowing from the hydraulic motor to the variable displacement pump. In the pressure regulating valve acting as a throttle, the energy of the hydraulic fluid flowing from the hydraulic motor to the variable displacement pump is partly converted into heat, which means that further undesired overrunning of the diesel engine is prevented. If, during normal driving operation, the usual lower pressures are present in the return line, the throttling action remains nonfunctional. However, if the direction of travel of the vehicle is reversed, the return line then has to serve as a flow line, which is under increased pressure and in which a throttling action would be undesirable. For this reason, in the known vehicle drive according to DE 199 30 997 A1, a line with a nonreturn valve is provided in parallel with the valve arrangement, so that the pressure regulating valve remains inactive when the flow direction is reversed. If it is intended to secure the vehicle against overrunning of the diesel engine in both directions of travel, then the arrangement described of the pressure regulating valve with the parallel-connected nonreturn valve is required in a dual arrangement. This parallel connection of the two functions by means of valves which are designed separately and independently of each other needs a great deal of installation space or leads to a restriction of the flow cross sections, associated with corresponding hydraulic-mechanical power losses.

The invention is therefore based on the object of providing a valve arrangement which acts as a throttle in only one flow direction, with which installation space is saved and at the same time the effort for mounting is reduced, in addition the greatest possible flow cross sections becoming possible in a small available installation space.

According to the invention, this object is achieved in accordance with claim 1 by a valve arrangement in a hydraulic circuit, having a longitudinal duct which opens into a transverse duct, having a tubular throttle slide which can be displaced in some regions in the longitudinal duct and which is acted on in the longitudinal duct with relatively different penetration depths in the direction of one of two different end positions by the hydraulic fluid flowing through the above arrangement, depending on its falling above or below a specific threshold pressure, having lateral passage openings in the wall of the throttle slide, which are arranged in a plurality of groups located with an axial spacing from one another and, in the end position of lower penetration depth of the throttle slide, are connected to the transverse duct while, in the end position of greater penetration depth, a first group of passage openings, facing the penetrating end of the throttle slide, is covered by the wall of the longitudinal duct, and having a tubular valve piston of stepped design which can be displaced in the throttle slide and, depending on its position in the throttle slide, blocks or enables the flow of hydraulic fluid through the interior of the valve piston in the region between the first group of passage openings and the remaining passage openings, a throttling action of the valve arrangement occurring as a result of intermediate positions of the valve slide between its two end positions and in the blocking position of the valve piston when hydraulic fluid under a pressure higher than the threshold pressure flows through the valve arrangement in the direction from the transverse duct to the longitudinal duct.

In claim 1, the threshold pressure means a specific pressure value of the hydraulic fluid flowing through the valve arrangement, which effects the change in the position of the throttle slide if, starting from a higher or lower pressure value, it is reached during the operation of the valve arrangement according to the invention.

The valve arrangement according to the invention is distinguished by the fact that hydraulic fluid under increased pressure can flow through it in both directions but a throttling action occurring only in one flow direction. The throttling action does not occur if the flow against the throttle slide is from one end, to be specific even if it assumes the end position of greater penetration against in accordance with the increased pressure of the hydraulic fluid. In this case, although the first group of its passage openings are covered, that is to say closed, the valve piston changes automatically from the blocking position into its enabling position and permits the hydraulic fluid to flow into the transverse duct via the remaining passage openings without hindrance. In this way, a line with a nonreturn valve led in parallel can be saved.

With the valve arrangement according to the invention, the same action is thus achieved as with the nonreturn valve located in a bypass line in an arrangement according to the prior art. However, the outlay on construction is lower; space is saved and larger flow cross sections can be implemented.

The fact that a pilot control valve is provided in the valve arrangement according to the invention presents no obstacle to this, since the said pilot control valve is expedient in any case for registering a specific threshold pressure of the hydraulic fluid.

Advantageous refinements and structural details of the valve arrangement according to the invention are specified in the independent claims.

The invention also covers the use of a valve arrangement according to claims 1 to 16 in a closed circuit of a hydraulic drive.

In this case, this can be, for example, the drive of a machine tool which is equipped with a hydraulic transmission. A particularly preferred field of application of the valve arrangement according to the invention is, however, vehicle drives. Therefore, the invention also extends to the arrangement for controlling a hydraulic vehicle drive.

The arrangement for controlling a hydraulic vehicle drive, according to the invention, is specified in claim 18 and comprises a closed hydraulic circuit which has an variable displacement pump driven by a diesel engine, a hydraulic motor driving the drive wheels of the vehicle and lines connecting the variable displacement pump and the hydraulic motor for the hydraulic fluid, it being possible for each of the lines to be the flow or return line of the hydraulic motor, depending on the direction of travel of the vehicle, a valve arrangement according to one of claims 1 to 16 being provided in at least one of the lines.

If the vehicle is to be secured against impermissibly high rotational speed of the diesel engine in overrun operation in both directions of travel, a valve arrangement according to the invention can be incorporated in each of the lines.

BRIEF DESCRIPTION OF THE FIGURES

The invention will be explained in more detail below using exemplary embodiments illustrated in the figures, in which.

DETAILED DESCRIPTION OF THE PREFERRED EMBODIMENTS

Figure 1:
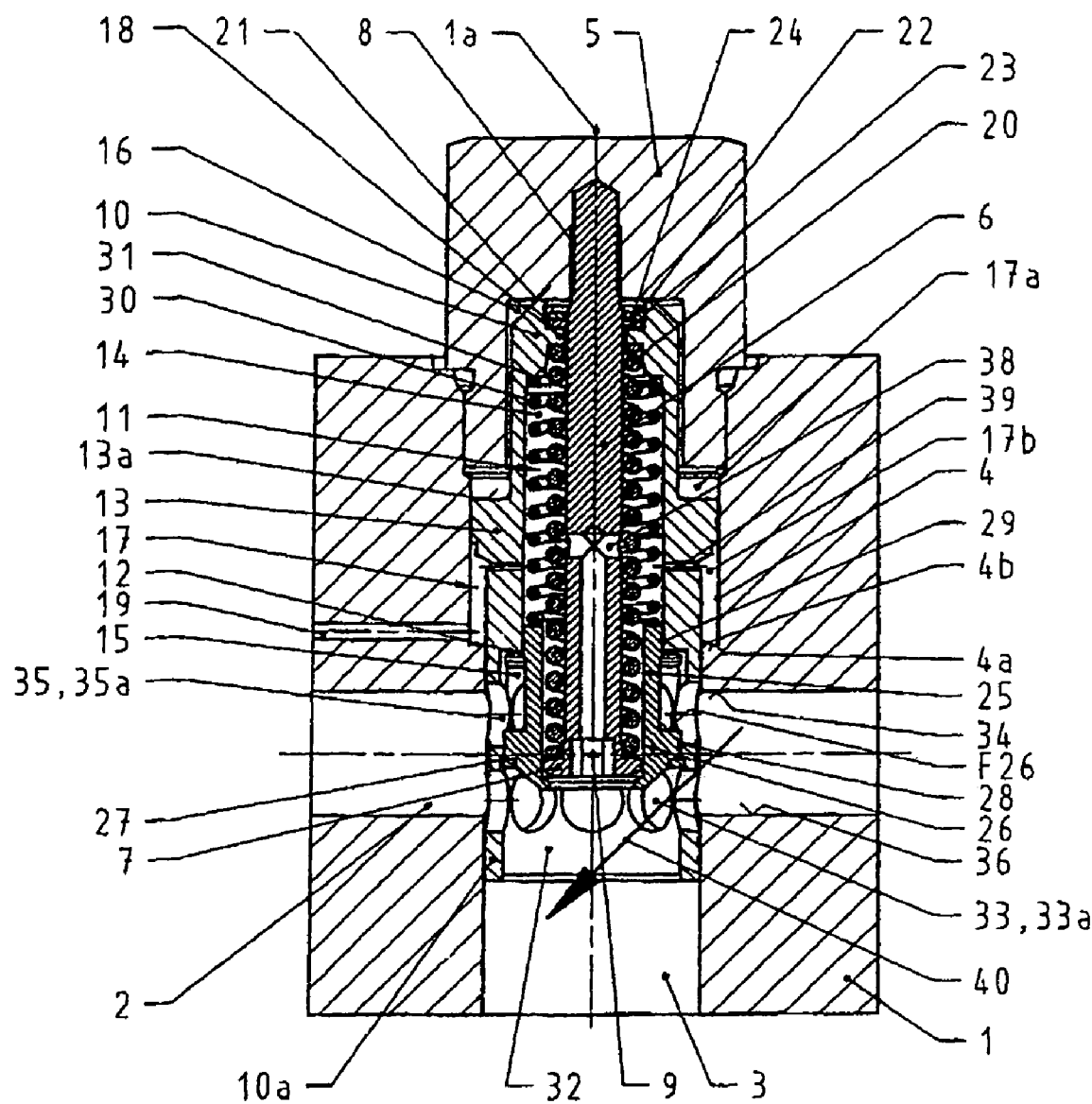
FIG. 1 shows the valve arrangement according to the invention in a longitudinal section, the arrangement being in its initial position.

In FIG. 1, the number 1 designates a stationary part which, in the illustration selected here, can be a separate housing, for example. However, the stationary part can be formed by a machine housing itself, for example the housing of an axial piston machine, the remaining parts then being incorporated directly in the housing of the machine. In the stationary part 1, the longitudinal axis 1*a* defines an axial direction which is important for the description of the valve arrangement. Transversely with respect to the longitudinal axis 1*a*, a transverse duct 2 runs in the stationary part 1, and arranged in the direction of the longitudinal axis 1*a* is the longitudinal duct 3, which is connected to the said transverse duct 2 and opens into the latter. The transverse duct 2 and the longitudinal duct 3 run at right angles to each other in the manner of a T or L (not shown). However, instead of a transverse duct 2 opening directly, it is also possible to arrange in the stationary part 1 an annular chamber which surrounds the longitudinal duct 3 and from which one or more transverse ducts branch off. A preferred field of application of this valve arrangement is the hydraulic circuit for driving a vehicle, as will be explained in more detail later. In this application, the longitudinal duct 3 is connected to a hydraulic variable displacement pump, while the transverse duct 2 is connected to the hydraulic motor of a vehicle.

Provided on the same axis as the longitudinal duct 3, that is to say likewise in the direction of the longitudinal axis 1*a*, is a holding and guiding bore 4, which is used for the installation of the movable valve element. The holding and guiding bore 4 is closed off from the outside in a pressure-tight manner by a closure screw 5.

Screwed into the closure crew 5 by means of a screw thread 8 is a tie rod 6. The latter projects into the region of the transverse duct 7 and, at its end already located in the transverse duct 2, is designed as a spring plate 7. Provided in the spring plate 7 is an opening in the form of a polygonal profile 9 which is used for the insertion of a rotary tool when the tie rod 6 is screwed into the closing screw 5.

In the holding and guiding bore 4, a throttle slide 10 is arranged such that it can be displaced longitudinally. In addition, it is also guided in the longitudinal duct 3 by its one end 10*a*. The throttle slide 10 has approximately the shape of a cylindrical tube and has a cylindrical interior 11 with a step 12. The step 12 subdivides the interior 11 into a spring chamber 14 of smaller diameter and a control chamber 15 of greater diameter.

In the region of the throttle slide 10 facing the closure screw 5, a control flange 13 is arranged on the outside of the said throttle slide 10. The control flange 13 has a first annular control face 13*a* on its one side facing the closure screw 5. The opposite side of the control flange 13, facing the transverse duct 2, has a stepped contour and, as a result, forms a second control face 13*b* and a third control face 13*c*, see FIGS. 2*a* and 2*b*.

The holding and guiding bore 4 does not have a constant diameter over its entire length. In its end region facing the transverse duct 2, the holding and guiding bore 4 has approximately the same diameter as the longitudinal duct 3. Between this end region and the closure screw 5, on the other hand, the diameter of the holding and guiding bore 4 is larger and substantially coincides with the outer diameter of the control flange 13 which is located on the throttling slide 10. Between these two regions, an annular step 4*a* having a circumferential throttling edge 4*b* is formed, see also FIGS. 2*a* and 2*b*. With its end opposite the transverse duct 2, the throttle slide 10 projects into a recess 16 of the closure screw 5. The diameter of this recess 16 is again smaller than the outer diameter of the control flange 13. In the assembled stage, the holding and guiding bore 4 thus forms an annular chamber 17, in which the control flange 13 moves. The displacement travel of the throttle slide 10 towards the outside, in the direction of the longitudinal duct 13, is limited by the control flange 13. This is because, in this direction of movement, the third, conical control face 13*c* of the control flange 13 comes into contact with the circumferential throttling edge 4*b* in the holding and guiding bore 4, again see FIGS. 2*a* and 2*b*.

The control flange 13 of the throttle side 10 subdivides the annular chamber 17 into two proportionate annular chambers 17*a* and 17*b*. Of these, the proportionate annular chamber 17*a* is arranged on the side of the closure screw 5, while the proportionate annular chamber 17*b* is located on the opposite side of the control flange 13, that is to say is oriented towards the side of the transverse duct 2 and the longitudinal duct 3. The proportionate annular chamber 17*b* is connected via a control duct 19 to a pressure limiting valve, which serves as a pilot control valve. The control duct 19 opens into the proportionate annular chamber 17b in the region of the annular step 4a.

Arranged so as to surround the tie rod 6 concentrically is a slide spring 20, which is formed as a helical compression spring. The slide spring is supported with its one end on the spring disc 7 of the tie rod 6. With its opposite end, the slide spring 20 acts on an annular collar 18, which is formed so as to project inwards in the spring chamber 14 of the throttle slide 10. The annular collar 18 is located in the end region of the spring chamber 14 that faces the closure screw 5 and therefore also of the throttle slide 10. As a result of the prestress of the slide spring 20, the throttle slide 10 attempts to move back in the holding and guiding bore 4 until it strikes the closure screw 5. The throttle slide 10 moves in the circularly cylindrical recess 16 of the closure screw 5 for this purpose and its end face strikes the inner face 21 of the recess 16.

Figure 5:
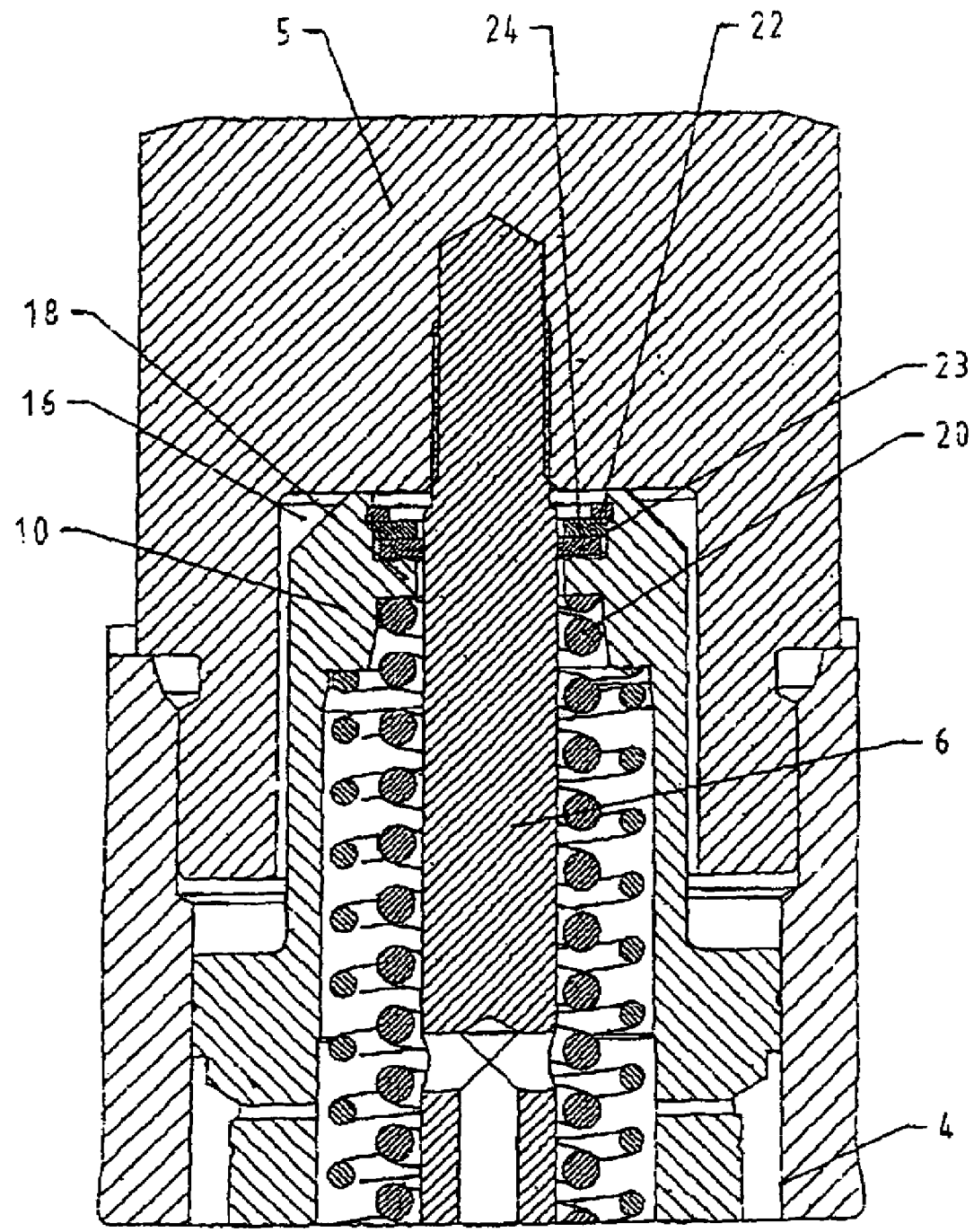
FIG. 5 shows an enlargement of a detail of a labyrinth seal between throttle slide and tie rod according to FIG. 1.

On the side of the annular collar 18 opposite the slide spring 20, two supporting discs 23 and 24 rest in a recess of the throttle slide 10. Of these, the first supporting disc 23 has a radial spacing with respect to the recess of the throttle slide 10 and bears closely on the tie rod 6, while the second supporting disc 24 bears tightly on the inner circumference of the recess and surrounds the tie rod 6 with a radial spacing. The two supporting discs 23 and 24 are retained in their position by a securing ring 22. The supporting discs 23 and 24 (see FIG. 5) act as a throttling labyrinth seal when the interior of the valve arrangement is filled with hydraulic fluid and the valve slide 10 is displaced actually in its holding and guiding bore 4. Therefore, the flow of hydraulic fluid into the recess 16 of the closure screw 5 is hindered and the movement of the valve slide 10 is damped.

Figure 6:
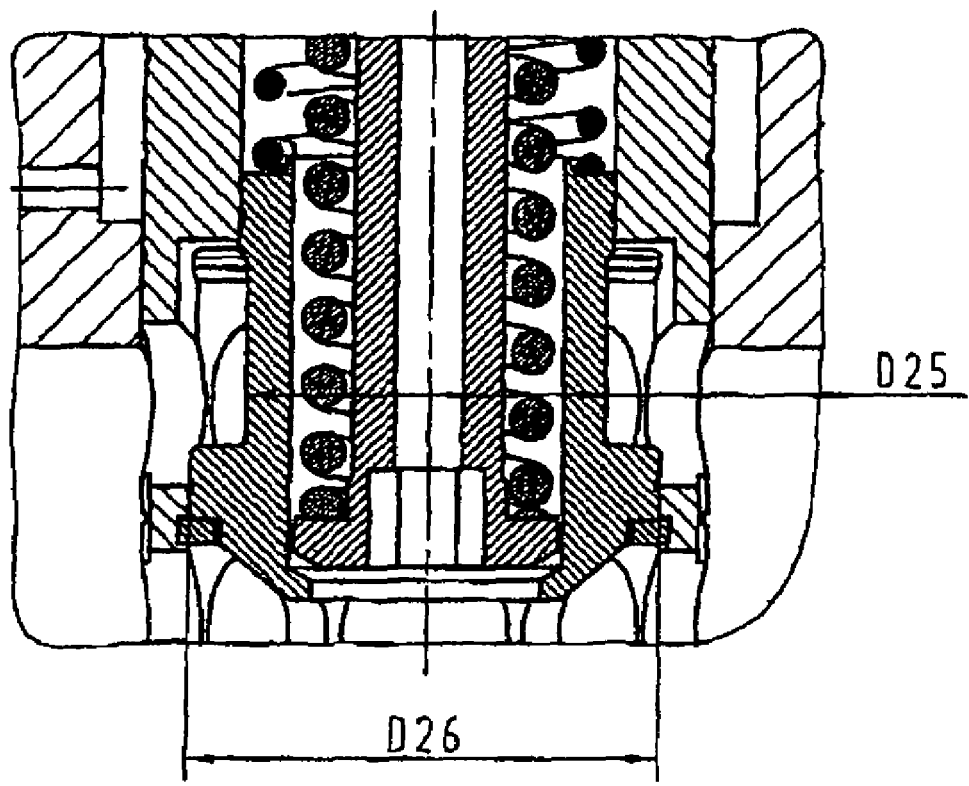
FIG. 6 shows an enlarged illustration of the valve piston in its position according to FIG. 1 with the diameters 025 and 026 entered.

In the interior 11 of the throttle slides 10, a valve piston 25 is guided such that it can move in the axial direction. The valve piston 25 also has the basic form of a continuously open cylindrical tube. Over the greatest part of its length, the valve piston 25 is formed as a hollow shaft with the external diameter $D_{25}$ (see FIG. 6). In its end region facing the longitudinal duct 3, the valve piston 25 is provided on the outside with a stop collar 26, whose external diameter is $D_{26}$ (see FIG. 6). The actually outwardly facing annular face of the stop collar 26 strikes a securing ring 27, which is inserted into the control chamber 15 from the inside. As a result, the outward movement of the valve piston 25 in the direction of the longitudinal duct 3 is limited. The inward movement is limited by the stop collar 26 coming to rest with its opposite annular face $F_{26}$ on the step 12 of the valve slide 10.

The circumferential face of the stop collar 26 forms a first guide face 28, with which the valve piston 25 is guided in a siding manner on the cylindrical inner surface of the control chamber 15. A second guide face 29 is located on a guide collar of the valve piston 25. The external diameter of this second guide face is matched to the internal diameter of the spring chamber 14.

The valve piston 25 is under the action of a piston spring 30, which loads the valve piston 25 with the effect of a downward displacement towards the securing ring 27. For this purpose, the piston spring 30 is supported on an annular shoulder 31 in the interior of the spring chamber 14 of the throttle slide 10. The slide spring 20 and the piston spring 30 are both formed as helical compression springs, which surround the tie rod 6 concentrically. It should be recorded that, in conjunction with the hydraulic forces yet to be described, the piston spring 30 can merely influence the position of the valve piston 25 within the throttle slide 10, and the slide spring 20 co-determines the position of the entire unit comprising throttle slide 10 and valve spring 25 within the holding and guiding bore 4.

The control chamber 15 of the throttle slide 10 has a pierced wall. In this way, a flow connection is produced between the outer circumference of the control chamber 15 and the interior 11 of the throttle slide 10. Since the throttle slide 10 is open at its end 32 facing the longitudinal duct 3, there is also a flow connection between the outer circumference of the control chamber 15 and longitudinal duct 3. In the practical exemplary involvement, the piercings in the wall of the control chamber consist of circular passage openings. These are arranged in groups in radial planes, that is to say in groups spaced apart axially. In the illustration according to FIG. 1, a first group 33 of eight passage holes 33a is located close to the lower end 36 of the transverse duct 2, and a second group 35 of eight passage openings 35a is arranged close to the upper edge 34 of the transverse duct 2.

Figure 3:
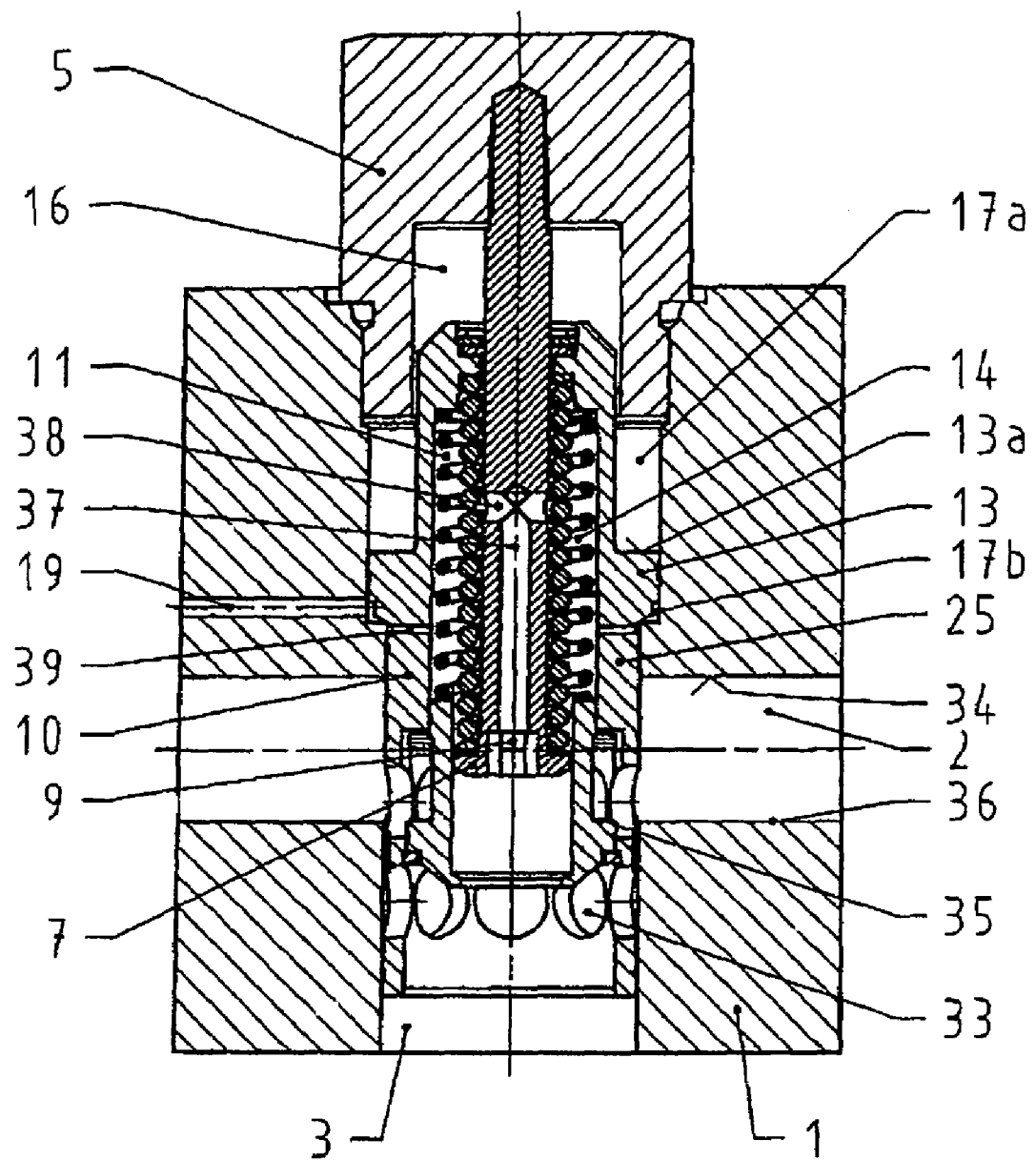
FIG. 3 illustrates a longitudinal section corresponding to FIG. 1, but the valve arrangement being in the switched throttling state with the valve piston extended.
Figure 4:
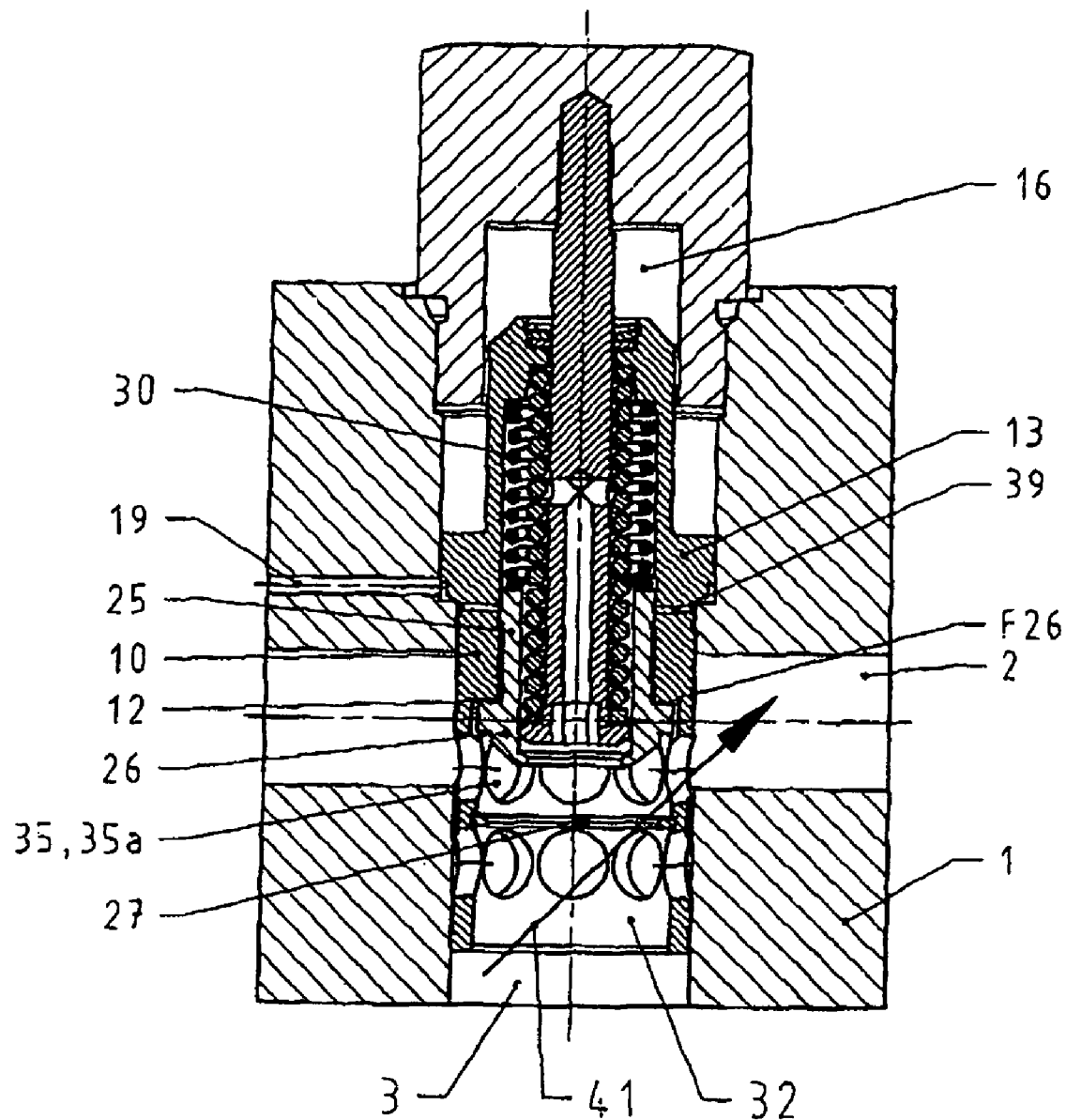
FIG. 4 reproduces the "switched state" of the valve arrangement according to the invention in the illustration of the same longitudinal section as previously with the valve piston retracted (flow direction: longitudinal duct to transverse duct)

It is critical that the formation of the control chamber 15 and the selected longitudinal dimensions of the throttle slide 10 in relation to the transverse duct 2 permit a flow connection between transverse duct 2 and the longitudinal duct 3 in any position of the throttle slide 10, irrespective of whether the throttle slide 10 assumes is furthest retracted position according to FIG. 1 or is furthest extended position according to FIG. 4. The flow path can be interrupted only by the valve piston 25, cf. FIG. 3. The stop collar 26 of the valve piston 25 subdivides the control chamber is located in the throttle slide 10 into two sections. When the stop collar 26 is resting on the securing ring 27 forming a valve seat, the two sections are separated hydraulically. The flow of hydraulic fluid through the passage openings 35a of the second group to the interior of the throttle slide 10 in the region of the end 32 of the latter is then blocked.

For the control of the valve arrangement according to the invention, a series of passage openings or holes is important, and will now be described in detail, primarily with reference to FIG. 3. In principle, in each position of the throttle slide 10 and of the valve piston 25, there is a continuous hydraulic connection from the longitudinal duct 3 to the proportionate annular chambers 17a and 17b and also to the control duct 19. This connection begins because the throttle slide 10 and the valve piston 25 are open at their ends facing the longitudinal duct 3. Furthermore, the spring plate 7 of the tie rod 6 has the opening already mentioned in the form of the polygonal profile 9. This opening continues in a longitudinal bore 37, which passes through virtually half the length of the tie rod and is connected to a transverse bore 38. In this way and via the normal leakages, the longitudinal duct 3 has a hydraulic connection to the interiors of the valve piston 25 of the throttle slide 10, to the free spaces of the holding and guiding bore 4, to the recess 16 in the closure screw 5 and to the proportionate annular chambers 17a and 17b.

The connection to the lower proportionate annular chamber 17b in FIG. 1, which has shrunk virtually to zero in FIG. 3 because of the extended position of the valve slide 10, is set specifically by means of radial throttling holes 39 in the wall of the throttle slide 10. In this way, a direct connection is produced between the proportionate annular chamber 17b and the spring chamber 14, that is to say also the interior 11 of the throttle slide 10. However, the proportionate annular chamber 17b can also be connected indirectly via the proportionate annular chamber 17a, by the radial clearance between the control flange 13 of the throttle slide 10 and the internal diameter of the annular chamber 17, which forms the holding and guiding bore 4 at this point, being set specifically. This measure could also be reinforced by axial openings, not illustrated, in the control flange 13. Each of the possible ways of connecting the proportionate annular chamber 17b hydraulically to the longitudinal duct 3 is possible on its own or in conjunction with the others. The throttling holes 39, the axial openings and the radial clearance between the control flange 13 and the internal diameter of the annular chamber 17 can thus be provided on their own in each case or together with the other possible connections. The control duct 19 is then connected to the proportionate annular chamber 17b.

In principle, it is possible to state that the position of the throttle slide 10 in its holding and guiding bore 4 is primarily determined by whether the pressure limiting valve connected to the control duct 19 has opened or not. The position of the valve piston 25 with respect to the throttle slides 10, on the other hand, results from the difference in the pressure of the hydraulic fluid in the region of the longitudinal duct 3 and of the transverse duct 2.

In detail, the valve arrangement described operates as follows:

FIG. 1 shows the valve arrangement in the opened (passive) state. The throttle slide 10 has retracted inwards into the closure screw 5 to the maximum extent under the influence of the slide spring 20. The valve piston 25, on the other hand, is extended from the throttle slide 10 to the maximum extent by the control spring 30. The throttle slide 10 and the valve piston 25 together form a type of telescopic tube. The pressure limiting valve connected to the control duct 19 is initially closed. This initial position is maintained as long as the pressures in the transverse duct 2 and therefore in the longitudinal duct 3 are approximately equally high and do not exceed a specific threshold value. The initial position is in this case also independent of the direction in which flow takes place through the valve arrangement. For the following description, it will be assumed that the flow takes place in the direction of the flow arrow 40 according to FIGS. 1 and 3, that is to say from the transverse duct 2 to the longitudinal duct 3.

First of all, the case will be considered in which the hydraulic fluid flowing through the transverse duct 2 to the longitudinal duct 3 is under increased pressure. This increased pressure will act in a manner outlined from the group 33 of passage openings as far as the proportionate annular chambers 17a and 17b and the control duct 19. If, ultimately, a threshold pressure is exceeded which corresponds to the response pressure of the pressure limiting valve, the latter opens. The consequence is a flow of hydraulic fluid, also designated the pilot control flow in the following text, through the control duct 19, so that there is a lower pressure in the latter and in the proportionate annular chamber 17b than in the remaining interior of the valve arrangement. The quantity of hydraulic fluid in the proportionate annular chamber 17b decreases. The reason for this is that, as hydraulic fluid continues to flow through the throttling holes 39, pressure losses arise, and the hydraulic fluid continuing to flow is therefore throttled. In addition, the axial openings in the control flange 13, already mentioned, or the radial clearance between the control flange 13 and the internal diameter of the annular chamber 17 can assist this action or exert it on their own. The pressure losses disrupt the force in equilibrium and, when it is large enough, has the effect that the unit of the telescopic tube comprising the throttle slide 10 and the control slide 25 is displaced further into the longitudinal duct 3 counter to the action of the slide spring 20, until ultimately the third control face 13c of the control flange 13 of the throttle slide 10 strikes the throttling edge 4b of the step 4a which is formed in the holding and guiding bore 4, cf. FIG. 2a. In this position, the hydraulic fluid can no longer flow through the throttle slide 10, since the first group 33 of passage openings is covered by the longitudinal duct 3 and the control slide 25 closes the internal cross section of the control chamber 15, cf. FIG. 3. As a result, the flow from the transverse duct 2 to the longitudinal duct 3 is initially closed.

However, the closed position is not maintained. As early as during the closing movement and definitely when the telescopic tube consisting of the throttle slide 10 and the valve piston 25 has reached the position illustrated in FIG. 3, this is because the pressure of the hydraulic fluid on the end 32 of the throttle slide 10 drops still further, until the pressure falls below the threshold value. Therefore, the pressure limiting valve will finally close again, and a uniform pressure is built up again in the entire interior of the valve arrangement. The force of the slide spring 20 is sufficient to slide the throttle slide 10 back in order to produce the connection between the transverse duct and the longitudinal duct 3 to such an extent that the pressure in the longitudinal duct 3 rises again.

The pressure in the longitudinal duct 3 is regulated dynamically in this way by the throttle slide 10 moving to and fro continually between the two positions shown in FIGS. 1 and 3. This is covered by the designation "regulated pressure loss". In the process, the throttle slide does not execute a full stroke between its maximum end positions. Instead, the throttle slide "oscillates" to and fro between partial positions located between its end positions, depending on the quantity of oil and its pressure.

During these processes, the relative position of the valve piston 25 with respect to the throttle slide 10 remains unchanged; this is because the pressure which is present in the longitudinal duct 3 and is lower than the pressure in the transverse duct 2 continues to act in the interior of the valve arrangement. The end of the valve piston 25 that faces the longitudinal duct 3 is always located in the region of the throttled flow on average over time, so that the pressure upstream of the valve piston will always be lower than the pressure prevailing outside in the region of the transverse duct 2. The hydraulic fluid under higher pressure in the region of the transverse duct 2, which acts on the telescopic tube with the effect of extending the latter, therefore provides the excursion. The valve arrangement therefore fulfils its purpose of throttling the flow of the hydraulic fluid entering the longitudinal duct 3 from the transverse duct 2 and of converting its flow energy partially into heat.

FIG. 4 illustrates the state in which the flow under increased pressure is taking place with a reversed flow direction, that is to say from the longitudinal duct 3 to the transverse duct 2, as the flow arrow 41 illustrates. Here, a throttling action is not desired. In this case, the unit consisting of the throttle slide 10 and the extended valve piston 25 will certainly move in the direction of the longitudinal duct 3, starting from the initial position according to FIG. 1, and will therefore throttle the flow, since the pressure limiting valve will also open again this time under the increased pressure in the interior of the valve arrangement. However, the undesired throttling action will be ended soon, since the valve piston 25 moves into the throttle slide 10 because of the pressure conditions of the valve piston 25.

This is because, in the position in which the valve piston 25 is pushed forward within the throttle slide 10, the entire end face of the valve piston 25 is under the higher pressure of the hydraulic fluid in the longitudinal duct 3. Since this hydraulic fluid fills the entire interior of the holding and guiding bore 4 and the recesses 16 in the closure screw 5, the hydraulic forces acting on the valve piston in the two displacement directions equalize, with the single exception of the annular face $F_{26}$, which is located on the rear of the stop collar 26. This annular face $F_{26}$ is dimensioned in accordance with the diameter $D_{26}$ on the outer side of the stop collar and the smaller shaft diameter $D_{25}$ of the shaft-like part of the valve piston 25. The annular face $F_{26}$ is under the lower pressure of the hydraulic fluid in the transverse duct 2, because it is connected to the transverse duct 2 via the second group 35 of passage openings. The differential force acting on the annular face $F_{26}$ from the two pressures of the hydraulic fluid in the transverse duct 2 and in the longitudinal duct 3 are ultimately sufficient to overcome the force of the control spring 30 and to move the valve piston 25 into the throttle slide 10, until the annular face $F_{26}$ of the stop collar 26 strikes the step 12 of the throttle slide 10, as FIG. 4 shows. Therefore, the control chamber 15 formed in the throttle slide is opened and, via the second group 35 of passage openings 35a, there is a flow connection between the longitudinal duct 3 and the transverse duct 2. The hydraulic fluid flows freely through the second group 35 of passage openings 35a and a throttling action is avoided. The throttle slide 10 remains extended as long as the pressure in the longitudinal duct 3 exceeds the threshold pressure. The valve piston 25 remains retracted as long as the pressure in the longitudinal duct 3 is sufficiently greater than the pressure in the transverse duct 2. As opposed to the "regulated throttling state" according to FIG. 3, there is now a "switched state", in which the throttle slide 10 and the valve piston 25 remain in a steady state. If, finally, the feed of hydraulic fluid under pressure to the longitudinal duct 3 is turned off, then the valve arrangement again assumes the initial position according to FIG. 1.

Figure 2A:
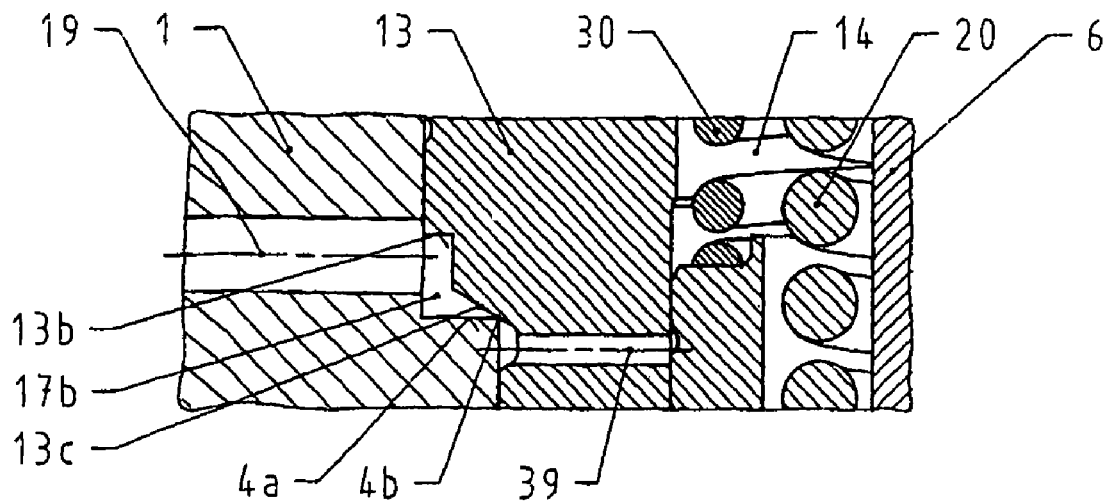
FIG. 2*a* has an enlarged detail from FIG. 1 as its subject.
Figure 2B:
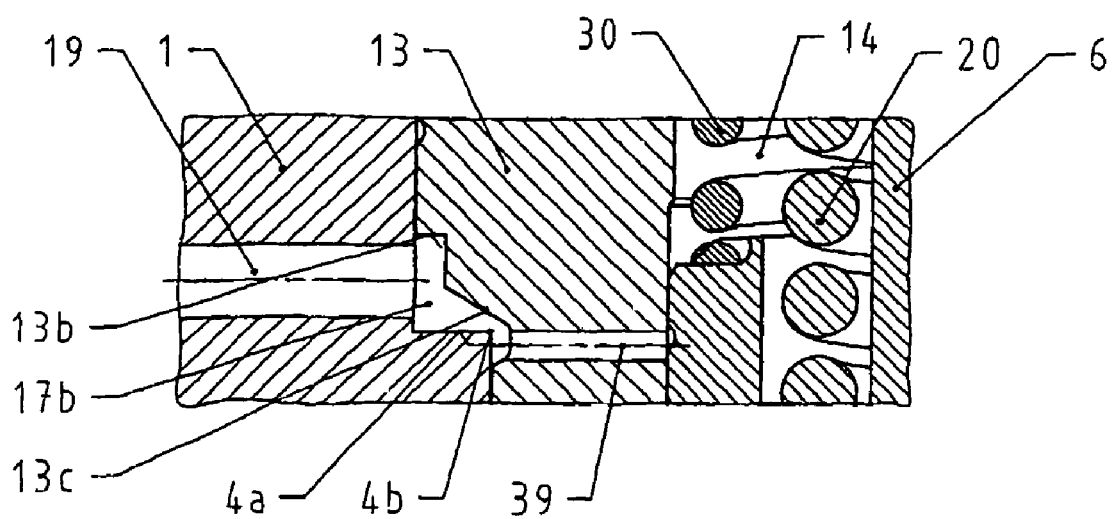
FIG. 2*b* is the illustration corresponding to FIG. 2*a* in a somewhat modified position of the parts in relation to one another.

FIGS. 2a and 2b explain the throttling process of the pilot control flow draining away through the pressure limiting valve as the throttle slide 10 approaches its closed position according to FIG. 3. This pilot control flow is to a certain extent to be viewed as a power loss and should be kept as small as possible. In the illustration of FIG. 2a, the control face 13c is in contact with the throttling edge 4b of the step 4a. The throttling holes 39 are then closed. However, as soon as the pressure limiting valve connected to the control duct 19 closes again, the throttle slide 10 moves upwards in the illustration of the figures and assumes the position shown in FIG. 2b. The third control face 13c, together with the throttling edge 4b, forms an entry opening to the throttling holes 39 but this entry opening being small for each throttling hole 39, that is to say likewise throttled. Otherwise, there is a connection to the control duct 19 via the second control face 13b. The displacement travel controlled by the pressure limiting valve between the positions according to FIGS. 2a and 2b is thus relatively small. In order to open the valve arrangement, that is to say in order to connect transverse duct 2 and longitudinal duct 3, however, it is necessary for the passage openings 33a of the first group 33 to enter into a connection with the transverse duct 2. This means that the throttling of the pilot control stream always becomes effective only when the throttle slide 10 occupies its end position in the longitudinal duct 3.

The position of the throttle slide 10, illustrated in FIG. 2a, with respect to the throttling edge 4b running around on the annular step 4a is primarily relevant during reverse travel. In this case, the throttle slide 10 moves again and again in the direction of the circumferential throttling edge, strikes there, in order then to move back again and to open a throttling cross section once more. The throttle slide 10 assumes a position with respect to the circumferential throttling edge 4b such that only so much oil is "removed" by the pilot control flow that a defined pressure difference is obtained. This means that the throttle slide 10 is kept precisely in the vicinity of the circumferential throttling edge 4b, that is to say its extreme maximum deepest position, that precisely the desired throttling of the pilot control flow occurs. It is therefore the minimum necessary pilot control flow that is removed in each case. During reverse travel, therefore, the extreme position of the throttle slide 10 illustrated in FIG. 2a is reached again and again, the throttle slide 10 always remaining only briefly in this position, so that after that, an appropriate throttling cross section is set between the third control face 13c and the circumferential throttling edge 4b in order to throttle the flow.

During forward travel, the position of the throttle slide 10, illustrated in FIG. 2a, with respect to the circumferential throttling edge 4b (contact position) will generally not be assumed but will in any case be regulated. In the regulated state, during forward travel "oscillation" of the throttle slide is implemented without reaching its maximum end position. However, if during forward travel a change is made from a regulated to the switched state, it is also possible for the third control face 13c to strike the circumferential throttling edge 4b during forward travel as well.

Consequently, the valve arrangement described acts as a throttling valve only when the hydraulic fluid is flowing through the transverse duct 2 to the longitudinal duct 3 and at the same time is under a pressure which lies above the threshold pressure at which the pressure limiting valve responds via the control duct 19. In the case of the opposite flow direction, that is to say from the longitudinal duct 3 to the transverse duct 2, on the other hand, no throttling action takes place even if the hydraulic fluid is under a pressure which is higher than the threshold pressure. In the case of pressures below the threshold pressure, the unit comprising the throttle slide 10 and the valve piston 25 assumes the initial position according to FIG. 1, in which the throttle slide 10 is retracted into the closure screw 5 and thus a throttling action likewise does not take place, specifically irrespective of the direction in which the hydraulic fluid may flow through the valve arrangement.

The various operating states of the valve arrangement according to the invention are summarized systematically in the following table:

| Hydraulic fluid | | Positions | | |
|---|---|---|---|---|
| Pressure of the hydraulic fluid above/below threshold pressure | Flow direction from/to longitudinal duct (3)/transverse duct (2) | Penetration depth of the throttle slide 10 in the longitudinal duct 3 | Position of the valve piston 25 in the throttle slide 10 | Result/flow state |
| below | from (2) to (3) | low | blocking position | Full flow through the first |
| below | from (3) to (2) | low | blocking position | row of holes 33, see FIG. 1 |
| above | from (2) to (3) | alternately low/high | blocking position | Regulated throttled flow through the first row of holes 33, see FIGS. 1/3 |

-continued

| Hydraulic fluid | | Positions | | |
|---|---|---|---|---|
| Pressure of the hydraulic fluid above/below threshold pressure | Flow direction from/to longitudinal duct (3)/transverse duct (2) | Penetration depth of the throttle slide 10 in the longitudinal duct 3 | Position of the valve piston 25 in the throttle slide 10 | Result/flow state |
| above | from (3) to (2) | high | Open position | Full flow through the second row of holes 35, see FIG. 4 |

From the preceding description it now also becomes clear how the valve arrangement described is to be incorporated in the closed hydraulic circuit of a hydraulic vehicle drive. Specifically, the longitudinal duct 3 must be connected to the variable displacement pump and the transverse duct 2 must be connected to the line leading to the hydraulic motor. When hydraulic fluid under high pressure is conveyed from the variable displacement pump to the hydraulic motor, the valve arrangement remains ineffective, since the flow through the throttle slide 10 is enabled. However, in the case of travel in the opposite direction, when the line provided with the valve arrangement according to the invention is the return line, through which the hydraulic fluid flows back from the hydraulic motor to the variable displacement pump, the valve arrangement remains ineffective only as long as the normal traction operation prevails and the hydraulic fluid thus flows back from the hydraulic motor to the variable displacement pump under reduced pressure. However, as soon as the vehicle changes to trailing or overrun operation, the increased pressure of the hydraulic fluid that builds up in the transverse duct 2 has the effect that the pressure limiting valve opens and therefore the throttle slide 10 and the valve piston 25 change into their extended positions in the direction of the longitudinal duct 3. The intended throttling action then occurs, a considerable part of the flow energy being converted into heat. This state is self-regulating, depending on the volume and pressure of the hydraulic fluid flowing back, and protects the diesel engine and the variable displacement pump reliably against overrunning.

The valve arrangement according to the invention initially offers two functions: in one flow direction, it provides a free through flow and in the opposite flow direction a throttling action. The third function can be added if the construction of the telescopic tube which comprises the throttle slide 10 and the valve piston 25 is designed such that the connection between the transverse duct 2 and the longitudinal duct 3 cannot be interrupted completely in any position of the telescopic tube. This can be implemented, for example, in the following way:

a) grooves (not illustrated) are made on the outside of the throttle slide 10 and specifically produce a connection between the first group 33 of passage holes and the second group of 35 of passage holes;

b) a further group (not illustrated) of openings is provided, which are never closed (not by the throttle slide 10 and not by the valve piston 25 either);

c) grooves or apertures are additionally arranged in the valve piston 25.

In this case, a bypass action is also added to the throttling action and is effective in both flow directions but has a positive effect in particular in the case of a flow from the transverse duct 2 to the S longitudinal duct 3.

What is claimed is:

1. Valve arrangement in a hydraulic circuit, having a longitudinal duct (3) which opens into a transverse duct (2) having a tubular throttle slide (10) which can be displaced in some regions in the longitudinal duct (3) and which is acted on in the longitudinal duct (3) with relatively different penetration depths in the direction of one of two different end positions by the hydraulic fluid flowing through the above arrangement, depending on its falling above or below a specific threshold pressure, having lateral passage openings (33*a*, 35*a*) in the wall of the throttle slide (10), which are arranged in a plurality of groups (33, 35) located with an axial spacing from one another and, in the end position of lower penetration depth of the throttle slide (10), are connected to the transverse duct (2) while, in the end position of greater penetration depth, group (33) of passage openings (33*a*), facing the penetrating end (32) of the throttle slide (10), is covered by the wall of the longitudinal duct (3), and having a tubular valve piston (25) of stepped design which can be displaced in the throttle slide (10) and, depending on its position in the throttle slide (10), blocks or enables the flow of hydraulic fluid through the interior of the valve piston (25) in the region between the first group (33) of passage openings (33*a*) and the remaining passage openings (35*a*), a throttling action of the valve arrangement occurring as a result of intermediate positions of the valve slide (10) between its two end positions and in the blocking position of the valve piston (25) when hydraulic fluid under a pressure higher than the threshold pressure flows through the valve arrangement in the direction from the transverse duct (2) to the longitudinal duct (3).

2. Valve arrangement according to claim 1, in which the two end positions of the throttle slide (10) are effected by a pilot control valve, which assumes its flow or blocking position in accordance with the threshold pressure.

3. Valve arrangement according to claim 2, in which, in its region facing away from the longitudinal duct (3), the tubular throttle slide (10) has on its outer circumference a control flange (13) which, together with a holding and guiding bore (4) of the valve arrangement, forms two proportionate annular chambers (17*a*, 17*b*), of which one (17*b*) has a hydraulic switching connection to the pilot control valve via at least one control duct (19).

4. Valve arrangement according to claim 3, having a slide spring (20) which, surrounding a stationary tie rod (6), is arranged in the interior of the throttle slide (10) and loads the latter with the effect of an outward movement out of the longitudinal duct (3).

5. Valve arrangement according to claim 3, having a step (4*a*) which is formed in the holding and guiding bore (4) and with which the control flange (13) of the control slide (10) comes into contact by means of a control face (13*c*) during its hydraulically effected inward movement into the longitudinal duct (3).

6. Valve arrangement according to one of claim 3, in which the at least one control duct (19) opens into the proportionate annular chamber (17*b*) associated with it in the region in which the holding and guiding bore (4) forms the step (4*b*).

7. Valve arrangement according to one of claim 3, having throttling holes (39) which are formed in the wall of the throttle slide (10) and connect the interior (11) of the throttle slide (10) to the proportionate annular chamber (17*b*), to which the at least one control duct (19) is connected.

8. Valve arrangement according to claim 7, in which the step (4*a*) forms a throttling edge (4*b*), on which the control face (13*c*) of the control flange (13), which is conical in this region, comes into linear contact, the throttling holes (39) opening outwards into this control face (13*c*).

9. Valve arrangement according to claim 1, having a piston spring (30), which is supported in the throttle slide (10) and loads the valve piston (25) against a support which is formed in the throttle slide (10) and is formed on the inside in the throttle slide (10) in the region between the first group (33) of passage openings (33*a*) and the remaining passage openings (35*a*).

10. Valve arrangement according to claim 9, in which the support is formed by a securing ring (27) inserted into the wall of the throttle slide (10).

11. Valve arrangement according to claim 9, in which the slide spring (20) and the piston spring (30) are formed as helical compression springs, which are arranged in a spring chamber (14) belonging to the interior (11) of the throttle slide (10), the piston spring (30) surrounding the slide spring (20) concentrically and the latter surrounding the stationary tie rod (6) concentrically.

12. Valve arrangement according to one of claim 9, in which two groups (33, 35) of passage openings (33*a*, 35*a*) are provided and the valve seat is located between these two groups.

13. Valve arrangement according to claim 12, having a stop collar (26) which surrounds the valve piston (25) on the outside and whose one annular end face, facing the longitudinal duct (3), is formed to rest on the valve seat, while its other, opposite annular end face is exposed to the passage openings (35*a*) of the second group (35) which is connected to the transverse duct (2) in each displaced position of the throttle slide (10).

14. Valve arrangement according to claim 13, in which the stop collar (26) of the valve piston (25) moves in a control chamber (15) which belongs to the interior (11) of the throttle slide (10) and has a larger internal diameter than the spring chamber (14).

15. Valve arrangement according to one of claim 3, the open end (32) of the throttle slide (10) present in the longitudinal duct (3) being connected hydraulically to the proportionate annular chamber (17*b*), which has a switching connection to the pilot control valve via the at least one control duct (19).

16. Valve arrangement according to one of claim 1, in which, on the side opposite the valve piston (25), and between the throttle slide (10) and a tie rod (6) guided in the latter, a labyrinth seal formed from supporting discs (23, 24) is arranged in order to damp pressure peaks.

17. A valve arrangement according to claim 1 for use in a closed circuit of a hydraulic drive.

18. Valve arrangement according to claim 1 for controlling a hydraulic vehicle drive, having a closed hydraulic circuit which has an variable displacement pinup driven by a diesel engine, a hydraulic motor driving the drive wheels of the vehicle and lines connecting the variable displacement pump and the hydraulic motor for the hydraulic fluid, it being possible for each of the lines to be the flow or return line of the hydraulic motor, depending on the direction of travel of the vehicle.

* * * * *

UNITED STATES PATENT AND TRADEMARK OFFICE
CERTIFICATE OF CORRECTION

PATENT NO. : 7,201,183 B2 Page 1 of 1
APPLICATION NO. : 11/060836
DATED : April 10, 2007
INVENTOR(S) : Reinhardt Thoms It is certified that error appears in the above-identified patent and that said Letters Patent is hereby corrected as shown below:

Column 14, line 25, strike the word "pinup" and insert -- pump --.

Signed and Sealed this

Twelfth Day of June, 2007

JON W. DUDAS
*Director of the United States Patent and Trademark Office*